(12) United States Patent  (10) Patent No.: US 8,531,538 B2
Nakai et al.  (45) Date of Patent: Sep. 10, 2013

(54) IMAGE PROCESSING APPARATUS, IMAGING APPARATUS, AND IMAGE PROCESSING METHOD

(75) Inventors: Motohiro Nakai, Kasugai (JP); Tomohiro Fukuoka, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 809 days.

(21) Appl. No.: 12/371,605

(22) Filed: Feb. 15, 2009

(65) Prior Publication Data
US 2009/0207283 A1 Aug. 20, 2009

(30) Foreign Application Priority Data

Feb. 15, 2008 (JP) ................................. 2008-034750

(51) Int. Cl.
*H04N 5/228* (2006.01)
*H04N 5/262* (2006.01)

(52) U.S. Cl.
USPC .................................. 348/222.1; 348/210.99

(58) Field of Classification Search
USPC .............. 715/725; 345/667–671; 348/222.1, 348/207.99, 240.99, 240.2; 382/232, 244
See application file for complete search history.

(56) References Cited

U.S. PATENT DOCUMENTS

| 6,972,771 | B2 * | 12/2005 | Nakano et al. | 345/589 |
| 7,012,641 | B2 * | 3/2006 | Kawabe | 348/240.2 |
| 7,436,539 | B2 | 10/2008 | Suwa et al. | |
| 2003/0006995 | A1 * | 1/2003 | Smith et al. | 345/671 |
| 2006/0181630 | A1 * | 8/2006 | Shioji et al. | 348/333.01 |
| 2007/0201742 | A1 * | 8/2007 | Hayashi | 382/167 |

FOREIGN PATENT DOCUMENTS

| JP | 7-99580 A | 4/1995 |
| JP | 2001-24928 A | 1/2001 |
| JP | 2004-184738 A | 7/2004 |
| JP | 2005-64547 A | 3/2005 |
| JP | 2008-11224 | 1/2008 |

OTHER PUBLICATIONS

Partial Translation of Japanese Office Action for Japanese Application No. 2008-034750.

* cited by examiner

*Primary Examiner* — Aung S Moe
(74) *Attorney, Agent, or Firm* — Fujitsu Patent Center (57) ABSTRACT

An image processing apparatus includes a decoding processor including a decoder configured to decode encoded data of image data of one frame having a plurality of pixels encoded by a variable length coding method and generating decoded data, and a data transfer unit configured to select decoded data in a target partial region in which a predetermined image processing is to be performed as partial image data out of the decoded data inputted from the decoder and transfer the selected data; and an image processor configured to perform the given image processing on the partial image data selected in the data transfer unit and store the image-processed partial image data in a storage device.

9 Claims, 9 Drawing Sheets

IMAGE PROCESSING APPARATUS, IMAGING APPARATUS, AND IMAGE PROCESSING METHOD

CROSS-REFERENCE TO RELATED APPLICATIONS

This application is based upon and claims the benefit of priority of the prior Japanese Patent Application No. 2008-34750 filed on Feb. 15, 2008 the entire contents of which are incorporated herein by reference.

FIELD

The embodiments discussed herein are related to an image processing apparatus, an imaging apparatus, and an image processing method.

BACKGROUND

In recent years, imaging apparatuses, such as digital cameras that convert an image signal obtained by an image sensor, such as a charge coupled device (CCD) image sensor, and record the converted signal in an embedded memory or a recording medium, have been widely used (for example, see Japanese Laid-open Patent Publication No. 2001-24928 and Japanese Laid-open Patent Publication No. 2008-11224). In such an imaging apparatus, when recording in a recording medium or the like is performed, image data of one frame having a plurality of pixels is encoded in the Joint Photographic Experts Group (JPEG) format to minimize the size of the image data and is then recorded.

The imaging apparatus includes an image processing apparatus having a function to clip a partial region in the image data of one frame and perform various imaging processing such as a magnification processing on the clipped image data (partial image data).

Figure 9:
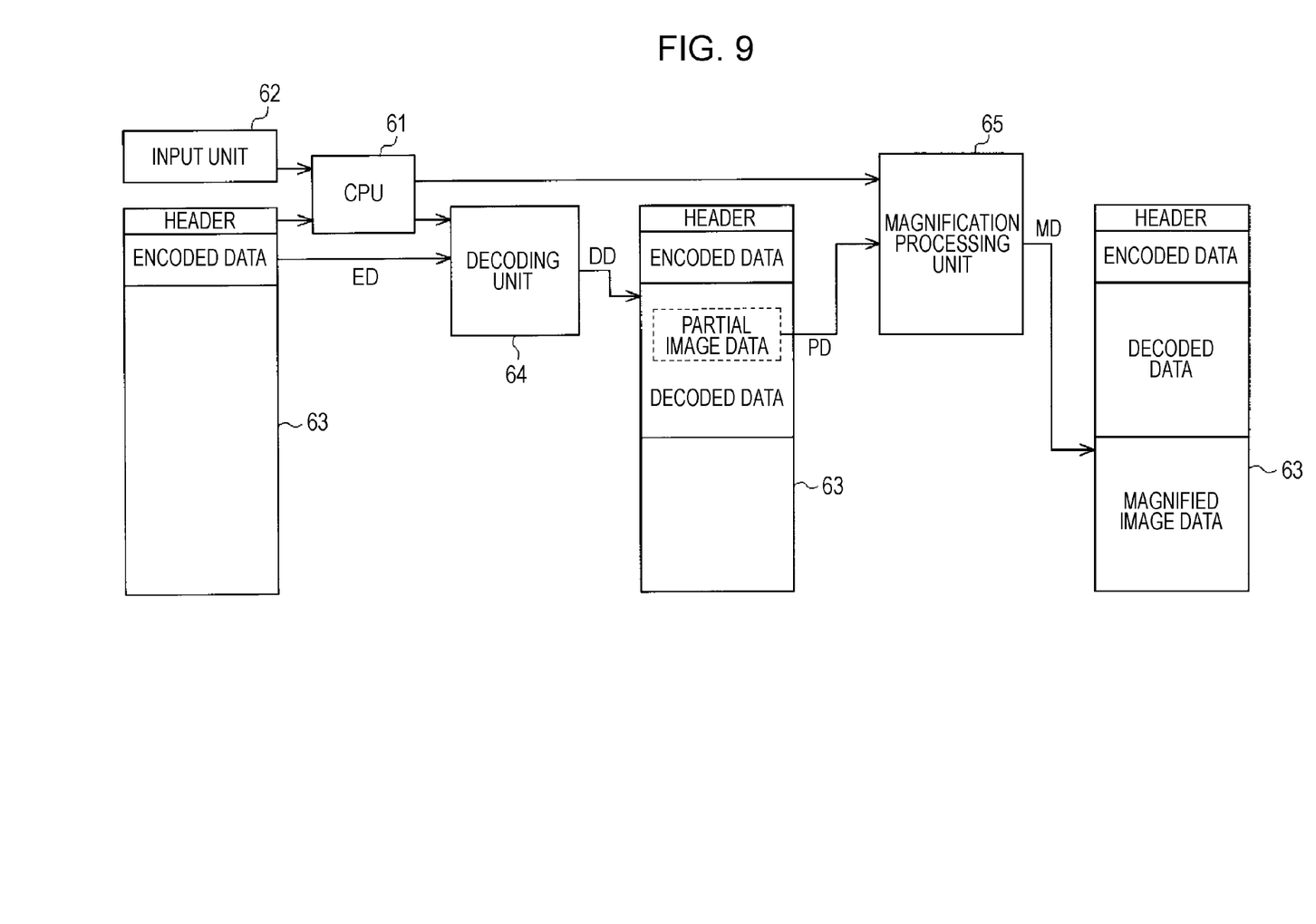
FIG. 9 illustrates an explanatory view of a magnification processing method.

FIG. 9 illustrates a schematic view of a flow in a magnification processing method performed on partial image data in a known image processing apparatus. As illustrated in FIG. 9, a central processing unit (CPU) 61 analyzes header information stored in a memory 63 formed by a Synchronous Dynamic Random Access Memory (SDRAM), or the like, and added to the encoded data ED, and acquires a decoded image size. The CPU 61 secures a memory region necessary to extract image data that has the acquired image size in the memory 63. Then, a decoding unit 64 reads the encoded data ED from the memory 63, decodes the encoded data ED, and sequentially writes the decoded image data (decoded data DD) in the secured memory region.

Meanwhile, operation information including a clipping position and a magnification rate of the partial image data, or the like, is inputted from an input unit 62 into the CPU 61. The CPU 61 sets the clipping position and the magnification rate of the partial image data for a magnification processing unit 65. The magnification processing unit 65, on the basis of the settings set by the CPU 61, reads decoded data (partial image data PD) of the partial region to be magnified in the decoded data DD of the one frame stored in the memory 63. Then, the magnification processing unit 65 magnifies the read partial image data PD according to the magnification rate. Further, the magnification processing unit 65 stores the magnified partial image data (magnified image data MD) in the memory 63. The magnified image data MD stored in the memory 63 in such a way is displayed on a display unit, for example, a liquid crystal display (LCD), or recorded as a separate file in a recording medium.

However, in the known image processing apparatus (method), as illustrated in FIG. 9, the magnification processing is performed on the partial image data PD. Accordingly, it is necessary to provide a large-capacity memory region for storing the encoded data ED of at least one frame, the decoded data DD of one frame, and the magnified image data MD. Especially, when the image data is encoded in a variable length coding format such as the JPEG format, it is not possible to clip the image data of a region if the all of the encoded data ED of one frame is not decoded. Accordingly, it is necessary to provide a large-capacity memory for storing the decoded data DD of one frame.

However, in recent years, functions of such an imaging apparatus have become highly sophisticated due to an increasing number of pixels and increasing image quality and the installation of continuous shooting functions or the like. With the increasing number of pixels, the increasing image quality, and the sophisticated functions, the data amount to be processed by the image processing apparatus is increased. Accordingly, the capacity of the memory 63 necessary for the image processing is also increased. However, with the desire to reduce the size and cost of an imaging apparatus, generally, the capacity (for example, a memory capacity necessary for implementing the above-described magnification processing) of the memory 63 is small. Accordingly, especially in such an imaging apparatus, if a large capacity memory is used in implementing the imaging processing as described above, the number of files extendable in the memory 63 is limited. Accordingly, the amount of processing that can be concurrently implemented is also limited, and overall processing time necessary for the image processing is also increased.

Further, not only in the case where the magnification processing is performed on the partial image data PD, but also the large memory capacity is necessary in a case where an image processing other than the magnification processing is performed on the partial image data PD. Further, the problem of the increasing processing time often occurs when only a small capacity memory is provided. In addition, the problem also occurs even if a large capacity memory is provided.

SUMMARY

According to an aspect of the invention, an image processing apparatus includes a decoding processor including a decoder configured to decode encoded data of image data of one frame having a plurality of pixels encoded by a variable length coding method and generating decoded data, and a data transfer unit configured to select decoded data in a target partial region in which a given image processing is to be performed as partial image data out of the decoded data inputted from the decoder and transfer the selected data; and an image processor configured to perform the given image processing on the partial image data selected in the data transfer unit and store the image-processed partial image data in a storage device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In the embodiments, an image processing apparatus, an imaging apparatus, and an image processing method for reducing a memory capacity necessary, for example, in performing an image processing on partial image data are provided.

Hereinafter, an embodiment of the present invention applied to a digital camera is described with reference to FIGS. 1 to 7.

Figure 1:
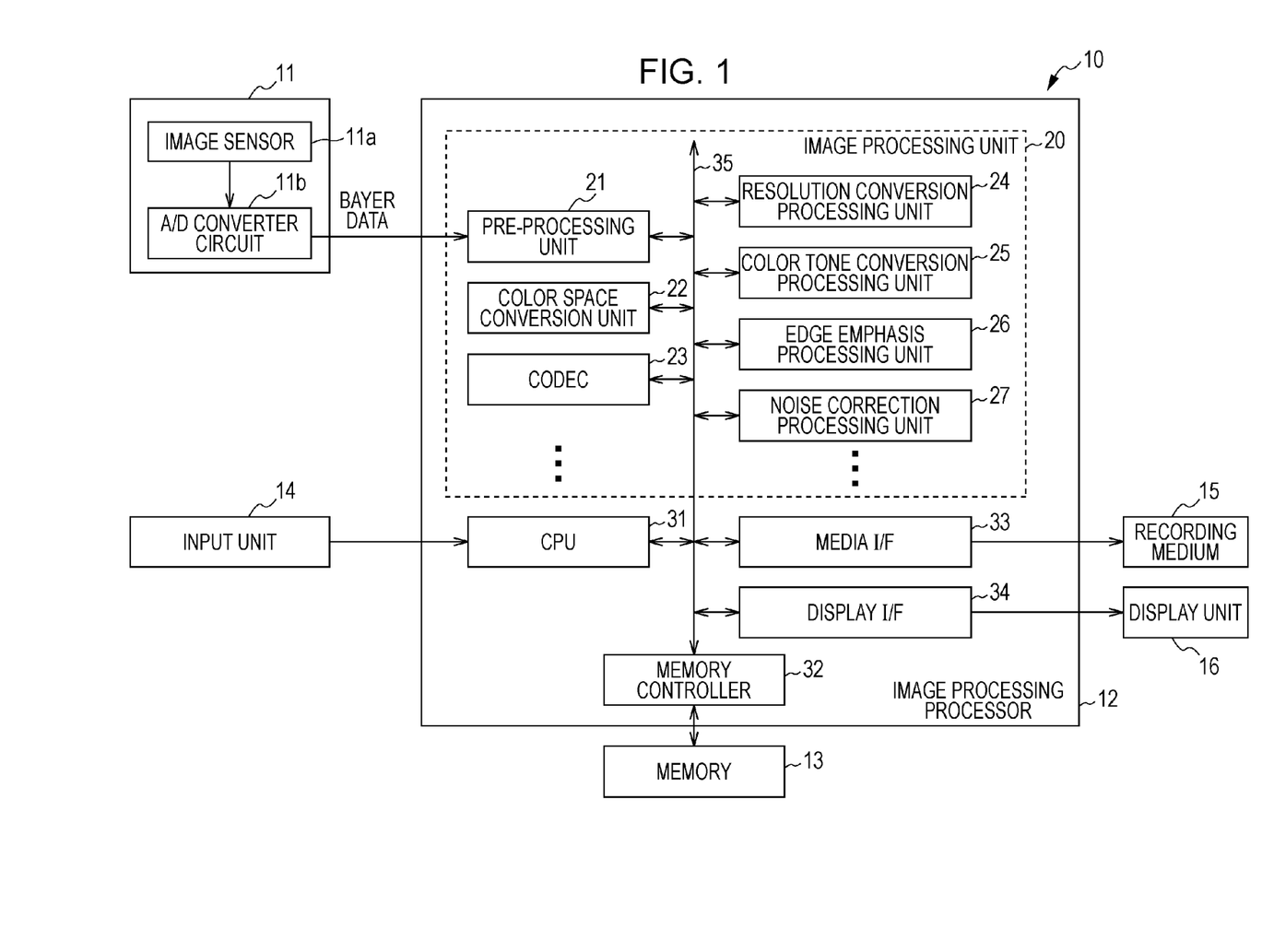
FIG. 1 illustrates a block diagram of an imaging apparatus.

As illustrated in FIG. 1, a digital camera 10 that functions as an imaging apparatus includes an imaging unit 11, an image processing processor 12 formed by a large-scale integration (LSI), a memory 13, an input unit 14, a recording medium 15, and a display unit 16.

The imaging unit 11 includes an image sensor 11a and an analog-digital (A/D) converter circuit 11b. The image sensor 11a has a Bayer array color filter, and outputs an image signal (analog signal) corresponding to incident light to the A/D converter circuit 11b. The A/D converter circuit 11b converts the image signal into a digital signal, and outputs the digital signal as image data (Bayer data) to the image processing processor 12. A CCD image sensor, a complementary metal-oxide semiconductor (CMOS) image sensor, or the like may be employed as the A/D converter circuit 11b.

The image processing processor 12 that functions as an image processing apparatus performs various image processings on the image data inputted from the imaging unit 11. In the processings, the image processing processor 12 temporarily stores the image data at a given processing step in the memory 13. That is, the memory 13 functions as a working memory. The memory 13 may be a rewritable memory such as a SDRAM. The image processing processor 12 also stores final image data on which the various image processings have been performed and stored in the memory 13 in the recording medium 15, and outputs the image data to the display unit 16. The recording medium 15 may be a portable memory card such as a Compact Flash (registered trademark), a Secure Digital card (registered trademark), or the like. An LCD, an organic electronic luminescence (EL), or the like may be employed as the display unit 16.

The input unit 14 has various switches that are operated by a user. The various switches may be used, for example, to set shooting conditions, to specify a clipping region (partial image data), to set an image processing to be performed on the clipping region, or to specify a magnification rate.

Now, an internal configuration of the image processing processor 12 is described.

The image processing processor 12 includes an image processing unit 20, a CPU 31, a memory controller 32, a media interface circuit 33, and a display interface circuit 34. The image processing unit 20 includes a pre-processing unit 21, a color space conversion unit 22, a codec 23, a resolution conversion processing unit 24, a color tone conversion processing unit 25, an edge emphasis processing unit 26, and a noise correction processing unit 27. Each of the processing units 21 to 27 in the image processing unit 20, the CPU 31, the memory controller 32, the media interface circuit 33, and the display interface circuit 34 are interconnected by a bus 35. The bus 35 includes an address bus, a control bus, and a data bus.

The CPU 31 performs overall control of each circuit. For example, the CPU 31 may control an analysis of data or an image, a setting of necessary information on the basis of an analysis result to each circuit, and writing and reading of data. Operation information set and specified by the various switches in the input unit 14 is inputted into the CPU 31.

The memory controller 32 writes or reads data in/from the memory 13 in response to a writing/reading request in/from the memory 13. The media interface circuit 33 performs a data input or output to the recording medium 15. The display interface circuit 34 converts image data transferred from the memory 13 into data of a format corresponding to the display unit 16.

The pre-processing unit 21 in the image processing unit 20 performs pre-processing, such as for example, a white balance adjustment, a gain adjustment, or a correction of a defect signal, on image data inputted from the A/D converter circuit 11b. The color space conversion unit 22 converts RGB format image data (Bayer data), which is pre-processed in the pre-processing unit 21, into image data of a YCbCr format. The image data of one frame processed in the pre-processing unit 21 and the color space conversion unit 22 are temporarily stored in the memory 13 via the memory controller 32.

The codec 23 reads the image data temporarily stored in the memory 13, encodes the image data in a given format (in the embodiment, JPEG format), and stores the encoded image data (encoded data ED) in the memory 13. Header information including encoded information is added to the encoded data ED, and the data is recorded as an encoded file in the recording medium 15 via the media interface circuit 33. The encoded data ED can be outputted to the display unit 16 via the display interface circuit 34.

Figure 4A:
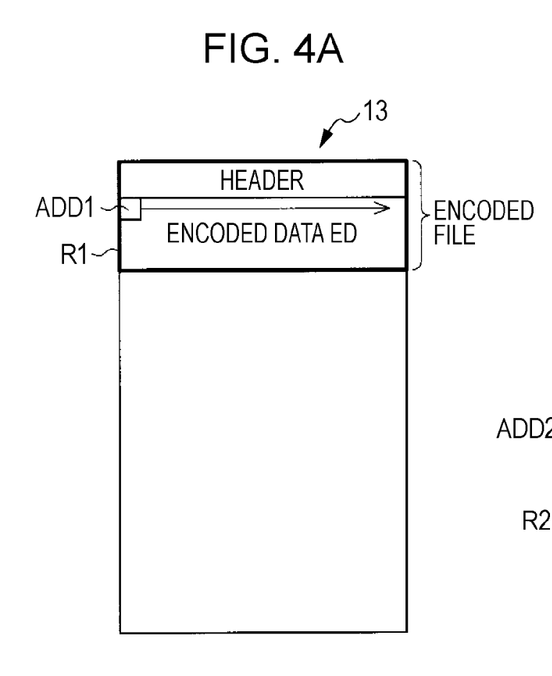
FIG. 4A illustrates an explanatory view of a memory region in which data is stored.
Figures 4B, 4C:
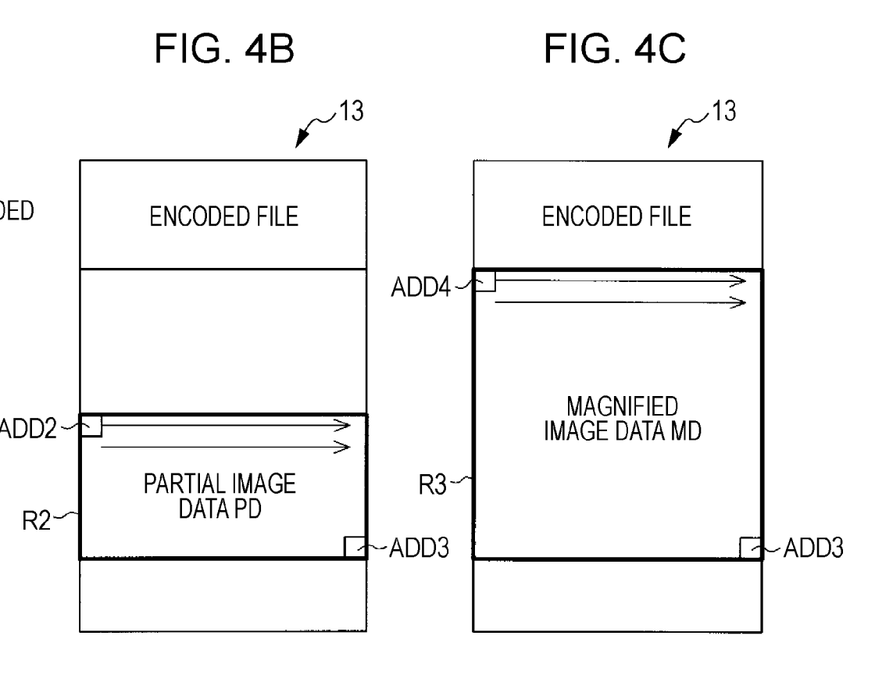
FIG. 4B illustrates an explanatory view of a memory region in which data is stored.
FIG. 4C illustrates an explanatory view of a memory region in which data is stored.

The codec 23, in a case where the encoded file recorded in the recording medium 15 by the control by the CPU 31 is stored in the memory 13, reads the encoded data ED (see FIG. 4) in the stored encoded file. Then, the codec 23 decodes the read encoded data in the JPEG format and stores the decoded image data (decoded data DD) in a minimum coding unit (MCU) in the memory 13. In the processing, in a case where various image processings are performed on only image data (partial image data PD) in a partial region in the decoded data DD, the codec 23 selects only the partial image data PD and stores the partial image data PD in the memory 13.

The resolution conversion processing unit 24 performs a resolution conversion processing for magnifying or demagnifying an image size (resolution) of the partial image data PD. The color conversion processing unit 25 performs a color conversion processing for converting a color tone of the partial image data PD into a sepia tone or a monochrome tone. The edge emphasis processing unit 26 performs an edge emphasis processing for emphasizing an edge of an image on the partial image data PD. The noise correction processing unit 27 performs a noise correction processing for removing noise contained in the partial image data PD.

Now, internal configurations of the codec 23 and the resolution conversion processing unit 24 that operate when an magnification processing is performed as a given image processing on partial image data PD are described in detail with reference to FIG. 2.

Figure 2:
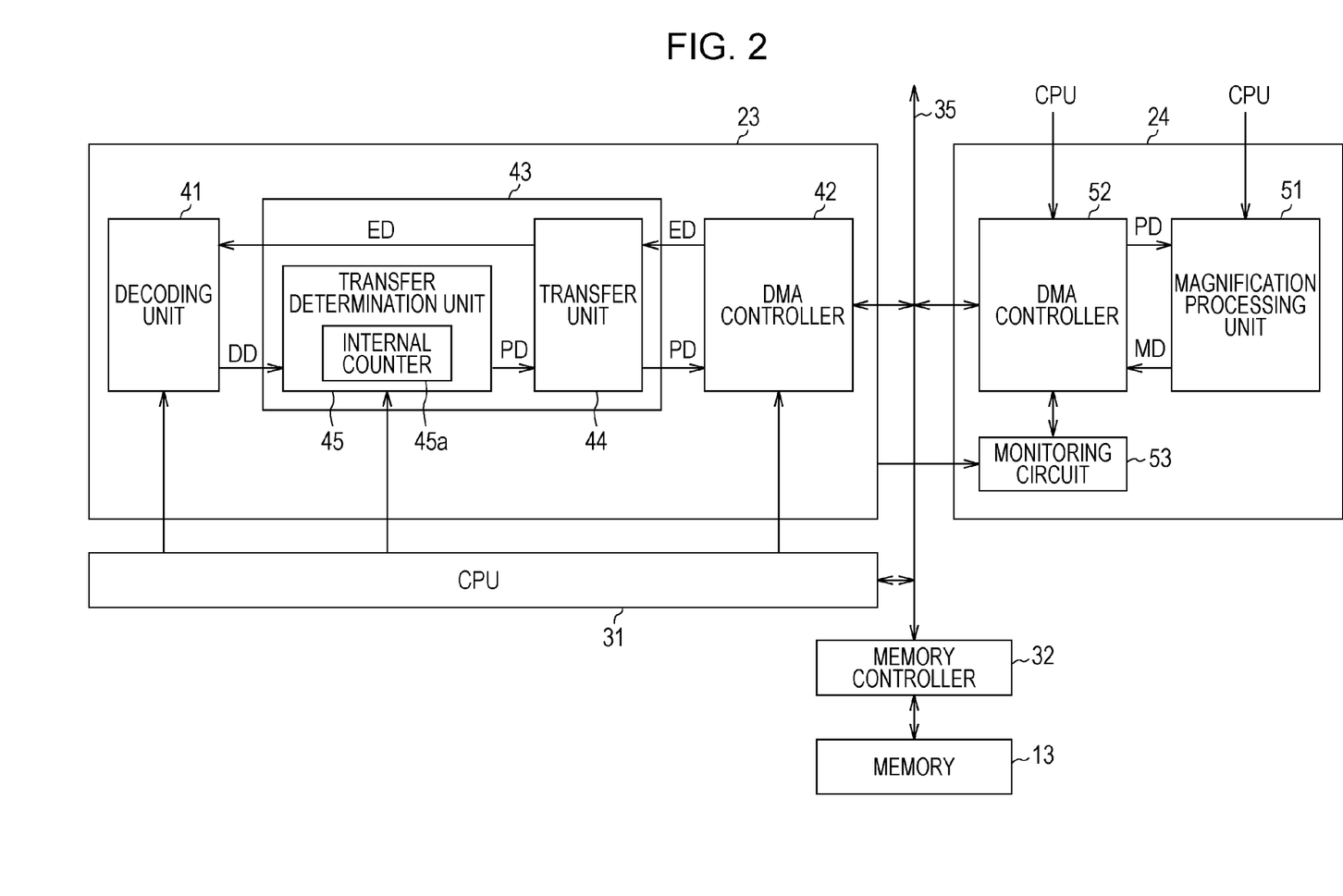
FIG. 2 illustrates a block diagram of an internal configuration of a codec and a resolution conversion processing unit.

In FIG. 2, the CPU 31, on the basis of operation information inputted from the input unit 14, acquires encoded file information of an encoded file on which a magnification processing is to be performed, position information (clipping position and image size) of partial image data PD, and a magnification rate. On the basis of the acquired encoded file information, the CPU 31 stores the encoded file to be a target of the magnification processing recorded in the recording medium 15 into a region R1 (see FIG. 4A) in the memory 13. The CPU 31 analyzes header information in the encoded file stored in the memory 13 and acquires an image size of an original image before the encoding processing, that is, a decoded image size and encoded information.

Encoded data ED is inputted from the memory 13 via a direct memory access (DMA) controller 42 and a data transfer unit 43 (transfer unit 44) to a decoding unit 41 in the codec 23. The decoding unit 41, on the basis of the encoded information set by the CPU 31, decodes the inputted encoded data ED and generates decoded data DD. The decoding unit 41, as indicated by the thin arrows in FIG. 3, sequentially outputs the decoded data DD in minimum coding units to a transfer determination unit 45 in the data transfer unit 43.

The transfer determination unit 45, on the basis of the position information of the partial image data PD set by the CPU 31 and a count value of an internal counter 45a, selects only partial image data PD out of the decoded data DD inputted from the decoding unit 41 and outputs the partial image data PD to the transfer unit 44.

Figure 3:
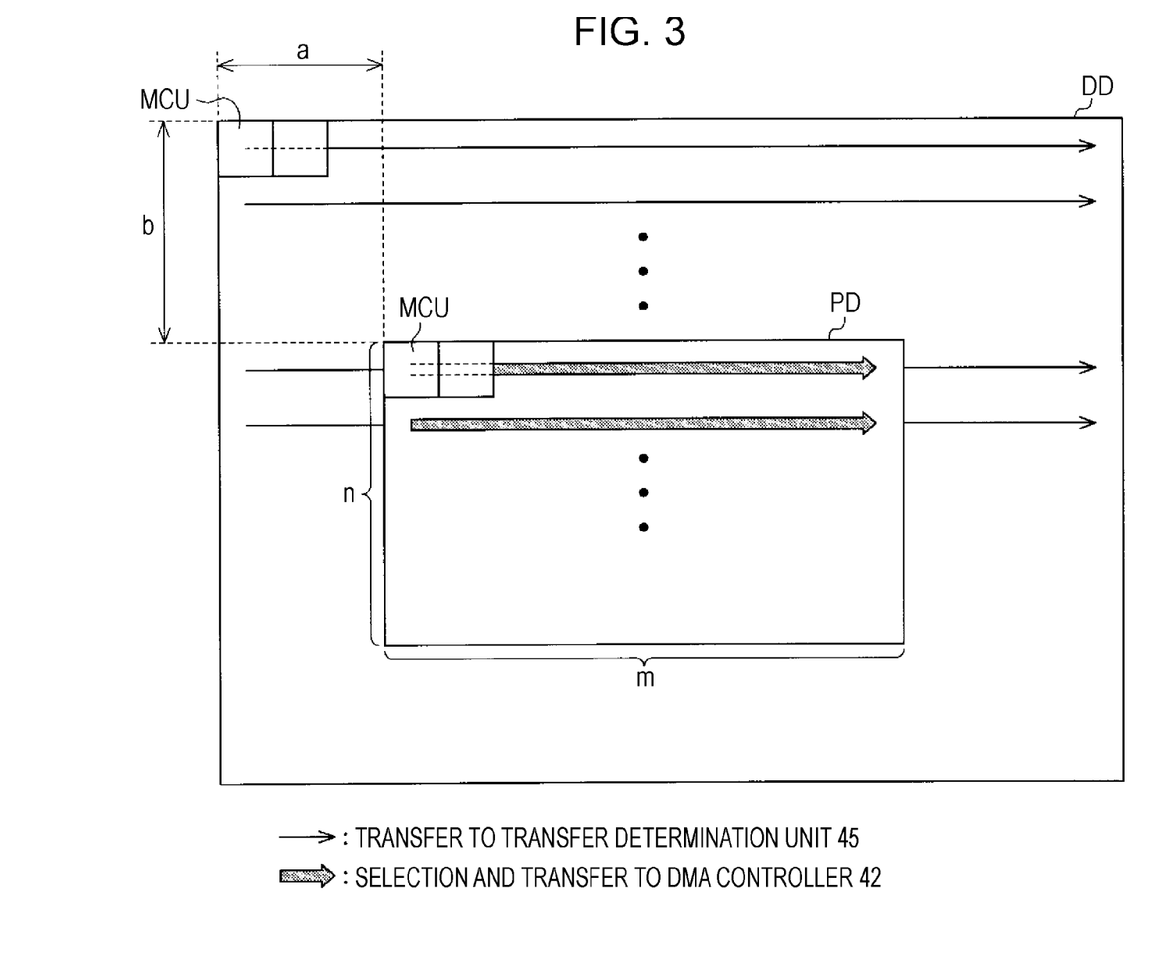
FIG. 3 illustrates an explanatory view of selection and transfer of partial image data.

More specifically, the position information of the partial image data PD includes, as illustrated in FIG. 3, offset information (horizontal offset a, vertical offset b) that indicates a clipping start position of the partial image data PD and size information that indicates a horizontal size m and a vertical size n of the partial image data PD. On the basis of the information and the count value, in a case where a pixel block of the size of m·n is inputted from a position offset by an amount of the offset information (a, b) from an upper-left pixel (pixel of start of encoding and decoding) of the decoded data of one frame, the transfer determination unit 45 selects the data as partial image data PD. Then, the transfer determination unit 45, as illustrated in thick arrows in FIG. 3, outputs only the selected partial image data PD in minimum control units to the DMA controller 42 via the transfer unit 44.

In FIG. 2, the DMA controller 42 controls data transfer between the memory 13 and the decoding unit 41 on the basis of a setting of a DMA transfer condition by the CPU 31. More specifically, the DMA controller 42, when a start address ADD1 (see FIG. 4A) for reading the encoded data ED from the region R1 in the memory 13 and a data size are set by the CPU 31, reads the encoded data ED in the order indicated by the arrow in FIG. 4A from the memory 13 and outputs the encoded data ED to the decoding unit 41 via the data transfer unit 43. Further, the DMA controller 42, when a start address ADD2 for writing the partial image data PD in a region R2 (see FIG. 4B) in the memory 13 and a data size are set by the CPU 31, writes the partial image data PD inputted from the data transfer unit 43 in the order indicated by the arrow in FIG. 4B into the region R2 in the memory 13.

As illustrated in FIG. 2, the partial image data PD is inputted into a magnification processing unit 51 in the resolution conversion processing unit 24 from the memory 13 via a DMA controller 52. The magnification processing unit 51, according to a magnification rate set by the CPU 31, performs a magnification processing for each of the partial image data PD of a given size (p q), generates magnified image data MD, and sequentially outputs the magnified image data MD to the DMA controller 52.

The DMA controller 52 controls data transfer between the memory 13 and the magnification processing unit 51 on the basis of a setting of a DMA transfer condition by the CPU 31. More specifically, the DMA controller 52, when the start address ADD2 (see FIG. 4B) for reading the partial image data PD from the region R2 in the memory 13 and a data size are set by the CPU 31, reads the partial image data PD in the order indicated by the arrows in FIG. 4B from the memory 13 and outputs to the magnification processing unit 51. Further, the DMA controller 52, when a start address ADD4 for writing the magnified image data MD in a region R3 (see FIG. 4C) in the memory 13 and a data size are set by the CPU 31, writes the magnified image data MD inputted from the magnification processing unit 51 in the order indicated by the arrows in FIG. 4C in the region R3 in the memory 13.

Now, the regions R2 and R3 in the memory 13 illustrated in FIGS. 4B and 4C will be described. First, for the sake of simplicity in the description, the region R3 in which the magnified image data MD is stored is described with reference to FIG. 4C. The CPU 31, on the basis of the size of the partial image data PD and the magnification rate acquired on the basis of the operation information from the input unit 14, acquires an image size of magnified partial image data (magnified image data MD). On the basis of the information, the CPU 31 sets the start address ADD4 for writing the magnified image data MD and the image size to the DMA controller 52 such that the region does not overlap with the region R1 where the encoded file is stored. Then, the region of the image size from the start address ADD4 to the magnified image data MD becomes the region R3. The magnified image data MD is written in the region R3. For the sake of simplicity, an end address of the region R3 is defined as "ADD3." As illustrated in FIG. 4B, with regard to the region R2 where the partial image data PD is stored, by the CPU 31, the start address ADD2 and the image size of the partial image data PD are set to the DMA controller 42 such that an end address of the region R2 (first region) corresponds to the end address ADD3 of the region R3 (second region). That is, the CPU 31 sets the preceding address from the end address ADD3 in the region R3 by the image size of the partial image data PD as the start address ADD2 in the region R2 to the DMA controller 42. Accordingly, the region from the start address ADD2 to the image size of the partial image data PD is to be the region R2. The partial image data PD is written into the region R2. As described above, in the embodiment, the regions R2 and R3 are set such that the storage regions of the partial image data PD and the magnified image data MD overlap with each other, that is, the magnified image data MD is written so that the magnified image data MD overwrites the partial image data PD. In the resolution conversion processing unit 24, data transfer is controlled by a monitoring circuit 53 such that the partial image data PD that has not been read for the magnification processing is not overwritten by the magnified image data MD. Thus, in the embodiment, the magnified image data MD is written so that the magnified image data MD overwrites the partial image data PD that is read.

As illustrated in FIG. 2, a monitoring circuit 53 monitors a process size of the partial image data PD that is written from the DMA controller 42 in the codec 23 into the memory 13, and controls a start or a stop of the reading from the memory 13 by the DMA controller 52. More specifically, the monitoring circuit 53 continues to output a read stop signal to the DMA controller 52 until the process size of the partial image data PD that is written exceeds the given size (p·q). The monitoring circuit 53 stops the output of the read stop signal when the process size of the partial image data PD that is written exceeds the given size (p·q). That is, the partial image data PD of the given size is stored in the memory 13.

Further, the monitoring circuit 53 monitors the region in the memory 13 where the magnified image data MD is to be written, and controls the start or stop of the writing in the memory 13 by the DMA controller 52. More specifically, the monitoring circuit 53 outputs the write stop signal to the DMA controller 52 when the magnified image data MD inputted from the magnification processing unit 51 is stored in the memory 13, and in a case where the partial image data PD that has not been read for the magnification processing in the memory 13 is overwritten by the magnified image data MD. The DMA controller 52 stops the reading of the partial image data PD from the memory 13 in response to the read stop signal from the monitoring circuit 53 and stops the writing of the magnified image data MD into the memory 13 in response to the write stop signal from the monitoring circuit 53.

Now, an image processing method for performing a magnification processing on partial image data PD is described with reference to FIGS. 5 to 7. First, a decoding processing and a method for storing only partial image data PD out of decoded data DD into the memory 13 are described with reference to FIG. 5.

Figure 5:
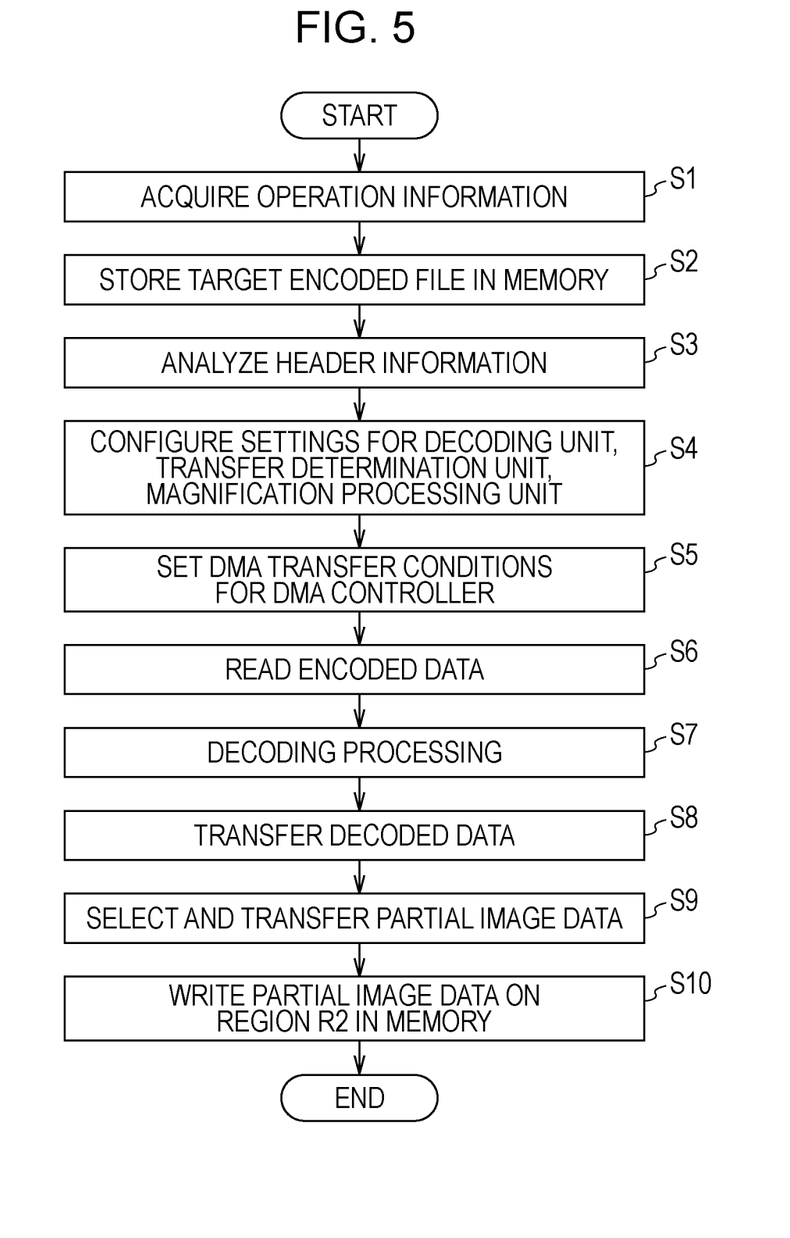
FIG. 5 illustrates a flowchart of a method for writing partial image data in a memory.

In step S1 in FIG. 5, operation information from the various switches in the input unit 14 is inputted into the CPU 31. That is, the CPU 31 acquires encoded file information to be magnified, position information (offset information (a, b), and image size (m·n)) of partial image data PD, and a magnification rate. In step S2, the CPU 31, on the basis of the acquired encoded file information, stores an encoded file to be magnified out of the encoded files recorded in the recording medium 15 into the region R1 in the memory 13 (see shaded area in FIG. 7A).

Then, the CPU 31 reads header information in the encoded file stored on the region R1 in the memory 13, and analyzes the header information (step S3). The CPU 31, on the basis of the analysis of the header information, acquires a decoded image size and encoded information.

In step S4, the CPU 31 sets various settings on the decoding unit 41, the transfer determination unit 45, and the magnification processing unit 51. That is, the CPU 31 sets the encoded information acquired by the analysis of the header information for the decoding unit 41, and sets the acquired position information of the partial image data PD for the transfer determination unit 45. Further, the CPU 31 sets the acquired magnification rate for the magnification processing unit 51.

In step S5, the CPU 31 sets DMA transfer conditions to the DMA controller 42 in the codec 23 and the DMA controller 52 in the resolution conversion processing unit 24, respectively. That is, the CPU 31, reads the encoded data ED from the region R1 in the memory 13 and sets, for the DMA controller 42, the DMA transfer conditions for writing the partial image data PD inputted from the decoding unit 41 on the region R2 in the memory 13. Further, the CPU 31, reads the partial image data PD from the region R2 in the memory 13 and sets, for the DMA controller 42, the DMA transfer conditions for writing the magnified image data MD inputted from the magnification processing unit 51 on the region R3 in the memory 13.

When the DMA transfer conditions are set, the DMA controller 42 sequentially reads the encoded data ED from the address ADD1 in the memory 13 and outputs the encoded data ED to the decoding unit 41. That is, the encoded data ED is read in the codec 23 (step S6). Then, the decoding unit 41, on the basis of the encoded information set by the CPU 31 in step S4, decodes the inputted encoded data (step S7), and transfers the decoded data DD in minimum control units to the transfer determination unit 45 (step S8).

In step S9, the transfer determination unit 45, on the basis of the position information of the partial image data PD set by the CPU 31 and the count value of the internal counter 45a, selects only the partial image data PD out of the inputted decoded data DD and outputs the partial image data PD out of the inputted decoded data DD to the DMA controller 42 (see FIG. 3). Then, the DMA controller 42 sequentially writes the partial image data PD inputted from the transfer determination unit 45 via the transfer unit 44 from the address ADD2 on the region R2 in the memory 13. That is, the codec 23 writes only the partial image data PD out of the decoded data DD in the region R2 in the memory 13 (step S10). Then, the processings from step S6 to S10 are repeatedly performed until all of the encoded data ED is decoded. Thus, as illustrated in FIG. 7B, the partial image data PD is written in the region R2 in the memory 13 (see shaded area).

Now, a method for performing a magnification processing on the partial image data PD stored in the memory 13 is described with reference to FIG. 6.

Figure 6:
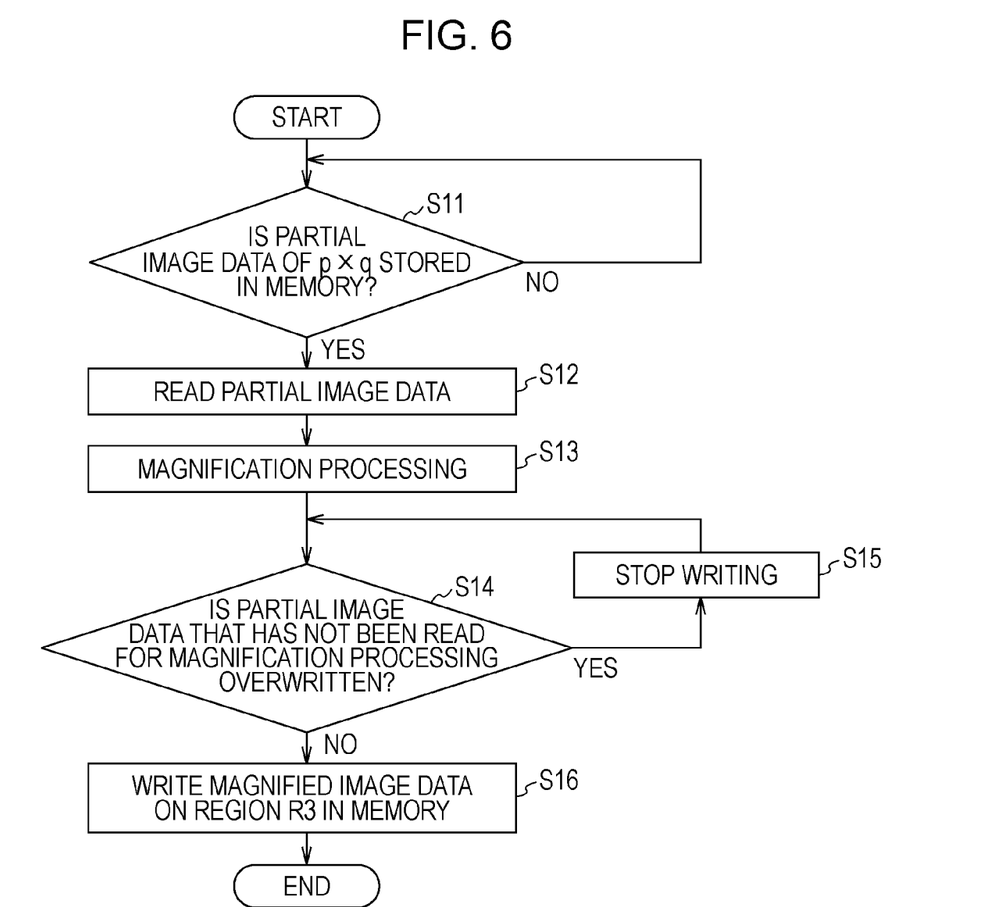
FIG. 6 illustrates a flowchart of a magnification processing method performed on partial image data.
Figure 7A:
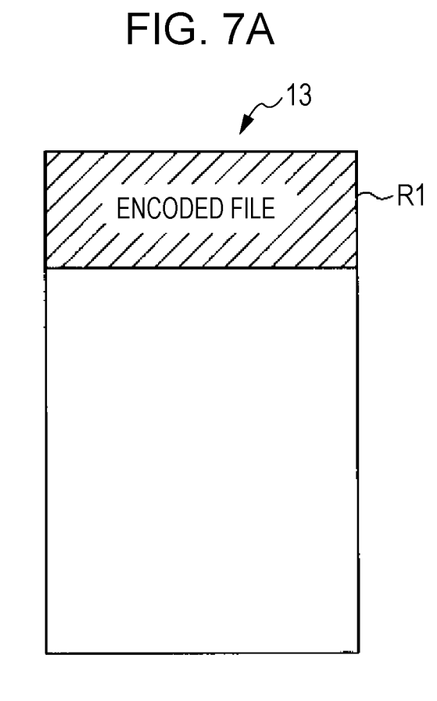
FIG. 7A illustrates an explanatory view of a memory allocation in a memory.
Figure 7B:
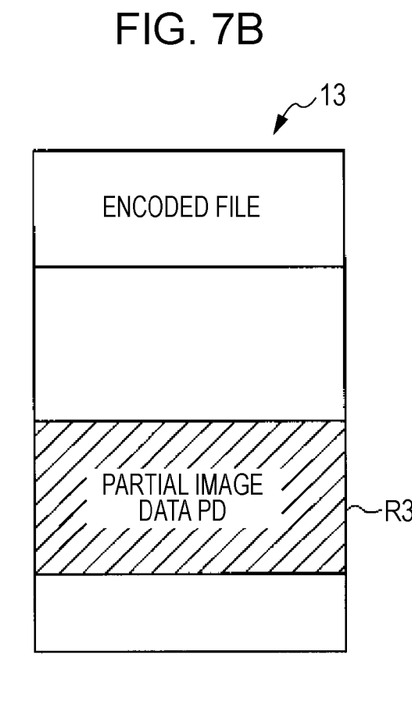
FIG. 7B illustrates an explanatory view of a memory allocation.
Figure 7C:
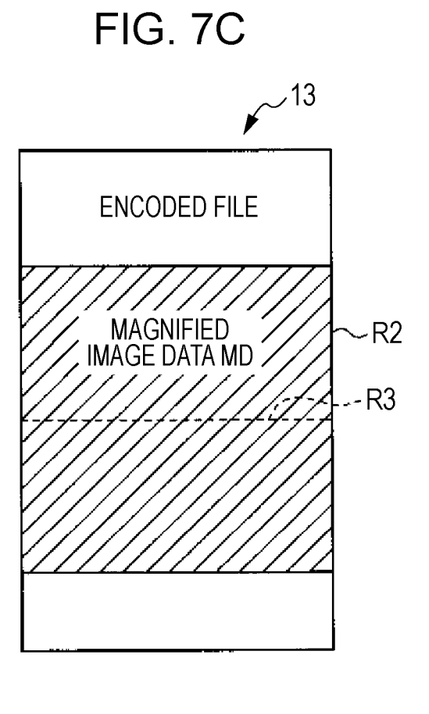
FIG. 7C illustrates an explanatory view of a memory allocation.

In step S11 in FIG. 6, the monitoring circuit 53 in the resolution conversion processing unit 24 determines whether the size of the partial image data PD stored in the memory 13 by the processings from step S6 to step S10 (see FIG. 5) exceeds the given size (p·q). Until the partial image data PD of p·q is stored in the memory 13 (NO in step S11), the monitoring circuit 53 outputs a read stop signal to the DMA controller 52 and stops the reading of the partial image data PD from the memory 13. When the partial image data PD of p·q is stored in the memory 13 (YES in step S11), the monitoring circuit 53 stops outputting the read stop signal to the DMA controller 52. Then, the DMA controller 52 sequentially reads the partial image data PD from the address ADD2 in the region R2 in the memory 13, and outputs the partial image data PD to the magnification processing unit 51. That is, the partial image data PD is read in the resolution conversion processing unit 24 (step S12).

The magnification processing unit 51, on the basis of the magnification rate set by the CPU 31 in step S4 (see FIG. 5), performs a magnification processing on each piece of the partial image data PD of the given size (p·q) (step S13). Then, in a case where the partial image data PD that has not been read for the magnification processing is overwritten by the magnified image data MD if the magnified image data MD is written into the memory 13 (YES in step S14), the monitoring circuit 53 outputs a write stop signal (step S15). In response to the write stop signal, the DMA controller 52 stops writing the magnified image data MD into the memory 13.

On the other hand, in a case where the partial image data PD that has not been read for the magnification processing is not overwritten by the magnified image data MD if the magnified image data MD is written into the memory 13 (NO in step S14), the processing proceeds to step S16. In step S16, the DMA controller 52 sequentially writes the magnified image data MD inputted from the magnification processing unit 51 from the address ADD4 in the region R3 in the memory 13. That is, the resolution conversion processing unit 24 writes the magnified image data MD into the region R3 in the memory 13. The processings from step S11 to S16 are repeatedly performed until the magnification processing is performed on all of the partial image data PD. In this way, as illustrated in FIG. 7C, the magnified image data MD is written into the region R3 in the memory 13 (see shaded area). Then, all of the partial image data PD stored on the region R2 in the memory 13 is overwritten by the magnified image data MD. As a result, as illustrated in FIG. 7C, the region used for performing the magnification processing on the partial image data PD becomes only the region R1 where the encoded file is stored and the region R3 where the magnified image data MD is stored.

According to the above-described embodiment, the following effects can be obtained.

(1) In the codec 23, the data transfer unit 43 is provided for selecting and transferring only partial image data PD out of inputted decoded data DD. In this way, out of the decoded data DD of one frame generated by the decoding unit 41, only the partial image data PD on which the magnification processing is performed is stored in the memory 13. Accordingly, in performing the magnification processing on the partial image data PD, it is not necessary to store the decoded data DD of one frame in the memory 13. Then, the partial image data PD that is stored in the memory 13 in place of the decoded data DD of one frame has a data amount smaller than that of the decoded data DD of one frame by an amount equivalent to "decoded data DD of one frame—partial image data PD". Accordingly, as compared to known image processing apparatuses that require a memory capacity for storing all of the decoded data DD of one frame, the memory capacity of the memory 13 necessary for performing the magnification processing on the partial image data PD can be reduced. As a result, in the image processing apparatus 12, the increase in the overall processing time necessary for the image processing that can be caused by an increase in the memory capacity necessary for the image processing can be appropriately reduced.

(2) The regions R2 and R3 are set such that the end address of the region R2 where the partial image data PD is stored and the end address of the region R3 where the magnified image data MD is stored correspond to each other. In this way, as illustrated in FIGS. 7B and 7C, the final data of the partial image data PD is overwritten by the final data of the magnified image data MD. That is, all of the partial image data PD is overwritten by the magnified image data MD. As a result, the regions used for performing the magnification processing on the partial image data PD are only the region R1 where the encoded file is stored and the region R3 where the magnified image data MD is stored. Accordingly, the memory capacity of the memory 13 necessary to perform the magnification processing on the partial image data PD can be reduced by the amount of the decoded data DD of one frame as compared to known image processing apparatuses.

(3) In the resolution conversion processing unit 24, a monitoring circuit 53 is provided that monitors a process size of the partial image data PD that is written from the codec 23 into the memory 13, and that controls a start or stop of a reading from the memory 13 by the resolution conversion processing unit 24. With the monitoring circuit 53, when the partial image data PD of the given size (p·q) is stored in the memory 13, a reading from the memory 13 can be started without control by the CPU 31. Further, with the monitoring circuit 53, the region in which the magnified image data MD is written in the memory 13 can be monitored, and the writing into the memory 13 can be controlled such that the partial image data PD that has not been read for the magnification processing is not overwritten by the magnified image data MD. In this way, the decoding processing and the writing of the partial image data PD into the memory 13 by the codec 23, the reading of the partial image data PD from the memory 13 by the resolution conversion processing unit 24, and the magnification processing and the writing of the magnified image data MD into the memory 13 can be concurrently and reliably performed. Accordingly, the processing time necessary to perform the magnification processing on the partial image data PD can be reduced.

(4) The DMA controller 42 and the DMA controller 52 are provided in the codec 23 and the resolution conversion processing unit 24, respectively. In this way, the data transfer between the codec 23 and the memory 13 and the data transfer between the resolution conversion processing unit 24 and the memory 13 can be performed by the DMA transfer method without using the CPU 31. Accordingly, the processing load of the CPU 31 in the image processing can be reduced.

The above-described embodiment can be realized in the appropriately modified embodiments described below.

Figure 8A:
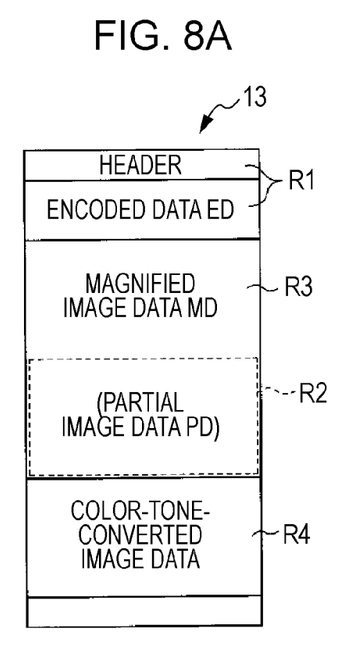
FIG. 8A illustrates an explanatory view of a memory allocation in another embodiment.

In the above-described embodiment, the image processing performed on partial image data is the magnification processing. However, other image processings, for example, a demagnification processing, a color tone conversion processing, an edge emphasis processing, or a noise correction processing may be performed on the partial image data. Further, a plurality of image processings may be performed on the partial image data. That is, after the color tone conversion processing is performed on the partial image data, magnification processing may also be performed. In such a case, as illustrated in FIG. 8A, a region R4 for storing the color tone converted image data may be provided separately from the regions R2 and R3. Further, since the image size of the color tone converted image data is the same as that of the partial image data PD, the color tone converted image data can be stored in the region R2 where the partial image data PD is to be stored. In this way, even if the kinds of the image processings are increased, the increase in the memory capacity in the memory 13 necessary to perform the image processing on the partial image data can be appropriately reduced.

Figure 8B:
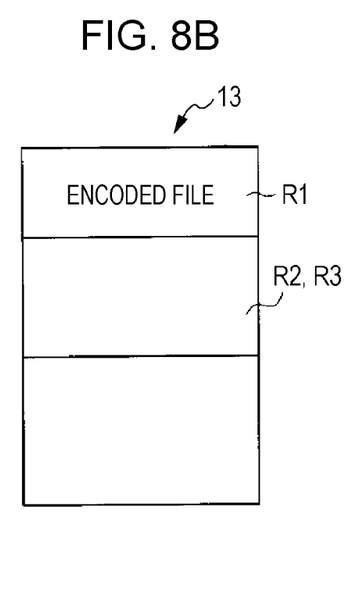
FIG. 8B illustrates an explanatory view of a memory allocation in yet another embodiment.

In a case where only an image processing (for example, the color tone conversion processing, the edge emphasis processing, or the noise correction processing) that does not change the image size is performed on the partial image data PD, as illustrated in FIG. 8B, the region R2 (third region) for storing the partial image data PD that is not image-processed and the region R3 (fourth region) for storing the image-processed image data may be the same region. In this way, similarly to the above-described embodiment, the memory capacity necessary for performing the image processing on the partial image data can be effectively reduced.

Further, in a case where at least a demagnification processing is performed on the partial image data PD, it is preferable to set the regions R2 and R3 such that a start address of the region R2 (fifth region) for storing the partial image data PD and a start address of the region R3 (sixth region) for storing demagnified image data correspond to each other. Alternatively, the regions R2 and R3 can be set such that the regions R2 and R3 do not overlap with each other.

Figure 8C:
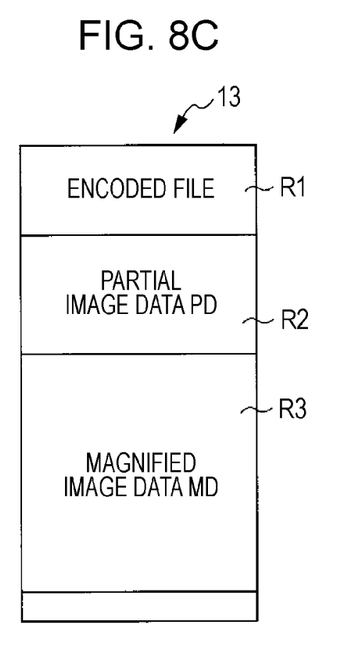
FIG. 8C illustrates an explanatory view of a memory allocation in yet another embodiment.

In the above-described embodiment, the partial image data PD that was magnified is overwritten by the magnified (image-processed) partial image data. That is, the regions R2 and R3 are set such that the end address of the region R2 where the partial image data PD is stored and the end address of the region R3 where the magnified image data MD is stored correspond to each other. However, the embodiment is not limited to the above. For example, as illustrated in FIG. 8C, the region R2 for storing the partial image data PD that is not magnified and the region R3 for storing the magnified image data MD that is magnified (image-processed) do not overlap with each other. In this way, the decoded data DD of one frame is not stored in the memory 13, but the partial image data PD that is a part of the decoded data DD of one frame is stored in the memory 13 (region R2). Accordingly, as compared to known image processing apparatuses, the memory capacity necessary for performing the image processing on the partial image data PD can be reduced by the amount equivalent to "decoded data DD of one frame—partial image data PD".

In the above-described embodiment, the partial image data PD selected by the transfer determination unit 45 is stored in the memory 13, and the stored partial image data PD is read by the resolution conversion processing unit 24. However, the embodiment is not limited to the above. For example, the partial image data PD can be directly transferred to the resolution conversion processing unit 24 without storing the partial image data PD from the data transfer unit 43 (DMA controller 42) into the memory 13. In such a case, magnification is performed in the resolution conversion processing unit 24 on the partial image data PD that is directly transferred from the codec 23, and the magnified partial image data is stored in the memory 13. That is, in this case, the image processing can be performed on the partial image data PD without storing both the decoded data DD of one frame and the partial image data PD transferred from the codec 23 in the memory 13. Accordingly, the memory capacity of the memory 13 necessary to perform the image processing on the partial image data PD can be reduced by the amount of the decoded data DD of one frame as compared to known image processing apparatuses.

In the above-described embodiment, by providing the monitoring circuit 53 in the resolution conversion processing unit 24, the decoding processing and the writing of the partial image data PD into the memory 13 by the codec 23, as well as the magnification processing and the writing of the magnified image data MD into the memory 13 by the resolution conversion processing unit 24 may be concurrently performed. However, the embodiment is not limited to the above. For example, the monitoring circuit 53 can be omitted, and after all of the writing of the partial image data PD into the memory 13 is completed, the magnification processing and the writing of the magnified image data MD into the memory 13 by the resolution conversion processing unit 24 can be performed. In such a case, the position of the region R2 where the partial image data PD is stored is not limited to the position illustrated in FIG. 4B, but, for example, the regions R2 and R3 may be set such that the start address ADD2 of the region R2 and the start address ADD4 of the region R3 for storing the magnified image data MD correspond to each other.

In the decoding processing by the codec 23 in the above-described embodiment, the decoding of the all of the encoded data ED is performed. However, the decoding to be performed after the decoding of the all of the partial image data PD is completed can be stopped. In such a case, for example, the transfer determination unit 45 can determine that the transfer of all of the partial image data PD is completed and stop the reading operation of the encoded data ED from the memory 13 by the DMA controller 42. In this way, the decoding performed on the encoded data read after the partial image data PD can be omitted, and the processing load can be reduced and the processing time can be further reduced.

The DMA controller 42 in the codec 23 in the above-described embodiment may be omitted. In such a case, the data transfer between the memory 13 and the decoding unit 41 may be performed by the CPU 31.

The DMA controller 52 in the resolution conversion processing unit 24 in the above-described embodiment may be omitted. In such a case, the data transfer between the memory 13 and the magnification processing unit 51 may be performed by the CPU 31.

In the above-described embodiment, the position information and the magnification rate of the partial image data PD is inputted as the operation information from the input unit 14 into the CPU 31. However, the embodiment is not limited to the above. For example, in a case where the image size in storing as an encoded file is determined in advance, the image size of the partial image data PD inputted from the input unit 14 can be compared with the image size in storing as the encoded file in the CPU 31, and a magnification rate in the magnification processing can be calculated. Similarly, in a case where an image size in displaying image data on the display unit 16 is determined in advance, or in a case where an image size in displaying image data on an external display apparatus is determined in advance, a magnification rate in the magnification processing can be calculated in the CPU 31.

Further, in a case where an aspect ratio of target image data (decoded data DD) to be image-processed differs from that of an output image outputted to the display unit 16 (external display apparatus), in the CPU 31, partial image data PD having a position and a size set so as to correspond to the aspect ratio of the output image can be automatically clipped from the decoded data DD.

The position information of the partial image data in the above-described embodiment, that is, the offset information (a, b) and the image size (m·n) can be data of a pixel unit, or data of an MCU unit.

In the above-described embodiment, in a case where the header information of the encoded file is encoded, the header information can be decoded in the codec 23 and the decoded header information can be transferred to the CPU 31. Then, the header information can be analyzed in the CPU 31.

Figure 8D:
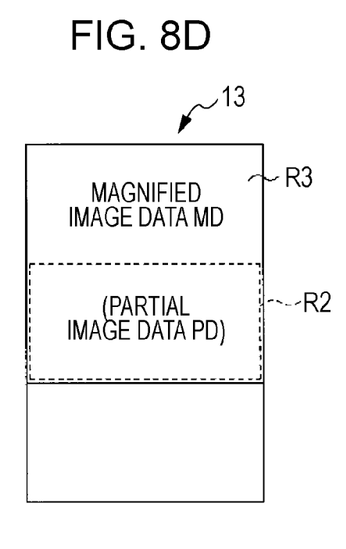
FIG. 8D illustrates an explanatory view of a memory allocation in yet another embodiment.

In the above-described embodiment, the encoded file from the recording medium 15 is temporarily stored into the memory 13 and the header information of the stored encoded file and the encoded data ED is read. However, the embodiment is not limited to the above. For example, the CPU 31 can analyze the header information of the encoded file read from the recording medium 15 and transfer the encoded data ED read from the recording medium 15 directly to the codec 23. In this way, the storage of the encoded file into the memory 13 can be omitted. Accordingly, as illustrated in FIG. 8D, the memory capacity necessary to perform the image processing on the partial image data PD can be further reduced.

In the above-described embodiment, the transfer determination unit 45 selects the partial image data PD out of the decoded data DD and outputs to the transfer unit 44. However, the embodiment is not limited to the above. For example, all of the decoded data DD can be inputted into the transfer unit 44, and only in a case where the partial image data PD is inputted into the transfer unit 44, the transfer determination unit 45 can permit a transfer operation of the transfer unit 44.

In the above-described embodiment, the image data is encoded in the JPEG format. However, if the format is a variable length coding format, the coding format is not limited to the above.

Each of the processing units 21 to 27 in the image processing unit 20 in the above-described embodiment may be configured as software.

The resolution conversion processing unit 24, the color tone conversion processing unit 25, the edge emphasis processing unit 26, and the noise correction processing unit 27 in the above-described embodiment may perform the various image processings on image data that is not encoded, that is, image data of a YCbCr format, and may temporarily store the image-processed image data in the memory 13. In such a case, the image processing to be performed on the image data that is not encoded can be one or a plurality of the above-described image processings. In this case, the codec 23 encodes the image-processed image data temporarily stored in the memory 13 in the JPEG format.

The image processing processor 12 in the above-described embodiment may be provided in an imaging apparatus (for example, a cell-phone with a built-in camera, a personal computer, a personal digital assistant (PDA), or a portable game device) other than a digital camera.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention has been described in detail, it should be understood that the various changes, substitutions, and alterations could be made hereto without departing from the spirit and scope of the invention.

What is claimed is:

1. An image processing apparatus comprising:
   a decoding processor including a decoder configured to decode encoded data of image data of one frame having a plurality of pixels encoded by a variable length coding method and generate decoded data, and a data transfer unit configured to select decoded data in a target partial region on which an image processing is to be performed as partial image data out of the decoded data inputted from the decoder and to store the selected partial image data in a storage device;
   an image processor configured to read the partial image data stored in the storage device and perform the given image processing on the partial image data and store the image-processed partial image data in the storage device; and
   a data transfer controller configured to control data transfer of data in the decoding processor and the image processor such that the partial image data stored in the storage device is overwritten by the image-processed partial image data,
   wherein the image processor includes at least a magnification processor configured to perform a magnification processing on the partial image data, and
   the data transfer controller configured to control data transfer of data in the decoding processor and the image processor such that an end address of a first region in the storage device configured to store the partial image data without magnification becomes substantially identical to an end address of a second region in the storage device configured to store the magnification-processed partial image data, and the first region and the second region overlap with each other.

2. The image processing apparatus according to claim 1, wherein,
   the data transfer controller configured to control data transfer of data in the decoding processor and the image processor such that a third region configured to store the partial image data on which a first image processing for not changing an image size of the partial image data is performed in the storage device
   and a fourth region configured to store the partial image data on which the first image processing is performed in the storage device are to be the same region in a case where the first image processing is performed on the partial image data, and the first image processing is selected from at least one among a color tone conversion processing, an edge emphasis processing, and a noise correction processing.

3. The image processing apparatus according to claim 1 wherein,
   the given image processing includes at least a demagnification processing, and
   the data transfer controller controls data transfer of data in the decoding processor and the image processor such that a start address of a fifth region configured to store the partial image data that is not demagnified in the storage device corresponds to a start address of a sixth region configured to store the demagnified partial image data in the storage device.

4. The image processing apparatus according to claim 1, wherein,
   the data transfer controller comprises
   a controller configured to control processings of the decoding processor and the image processor, and
   a Direct Memory Access controller configured to perform data transfer between the storage device and one of the decoding processor and the image processor by a Direct Memory Access transfer method.

5. The image processing apparatus according to claim 1, wherein, the image processor comprises a monitoring circuit for monitoring a size of the partial image data transferred by the decoding processor, for monitoring a region where the image-processed partial image data is stored in the storage device, and for controlling data transfer such that the given image-processed partial image data overwrites the region of the partial image data that is read for the given image processing out of the partial image data that is stored in the storage device and in which the given image processing is not performed.

6. The image processing apparatus according to claim 1, wherein, the data transfer unit includes a data transfer determination unit configured to select the partial image data based on a clipping position and an image size of the partial image data inputted from the controller configured to control processings of the decoding processor and the image processor.

7. The image processing apparatus according to claim 1, wherein, the decoding processor stops the decoding processing when the transfer of all partial image data by the data transfer unit is completed.

8. An imaging apparatus comprising:
   an image sensor;
   a decoding processor including a decoder configured to decode encoded data of image data of one frame having a plurality of pixels encoded by a variable length coding method and generate decoded data, and a data transfer unit configured to select decoded data in a target partial region in which a given image processing is to be performed as partial image data out of the decoded data inputted from the decoder and store the selected partial image data;

an image processor configured to read the partial image data stored in the storage device and perform the given image processing on the partial image data and store the image-processed partial image data in the storage device; and a data transfer controller configured to control data transfer of data in the decoding processor and the image processor such that the partial image data stored in the storage device is overwritten by the image-processed partial image data, wherein the image processor includes at least a magnification processor configured to perform a magnification processing on the partial image data, and the data transfer controller configured to control data transfer of data in the decoding processor and the image processor such that an end address of a first region in the storage device configured to store the partial image data without magnification becomes substantially identical to an end address of a second region in the storage device configured to store the magnification-processed partial image data, and the first region and the second region overlap with each other.

9. An image processing method comprising:

decoding encoded data of image data of one frame having a plurality of pixels encoded by a variable length coding method and generating decoded data;

selecting decoded data in a target partial region in which a given image processing is to be performed as partial image data out of the decoded data;

storing the selected partial image data in a storage device;

performing a given image processing on the partial image data read from the storage device; and storing the partial image data on which the given image processing is performed in the storage device;

performing a magnification processing on the partial image data;

controlling data transfer of data such that an end address of a first region in the storage device configured to store the partial image data without magnification becomes substantially identical to an end address of a second region in the storage device configured to store the magnification-processed partial image data, and the first region and the second region overlap with each other.

* * * * *